H. D. THAYER.
APPARATUS FOR TREATING THE SOIL.
APPLICATION FILED OCT. 22, 1913.
1,171,277.
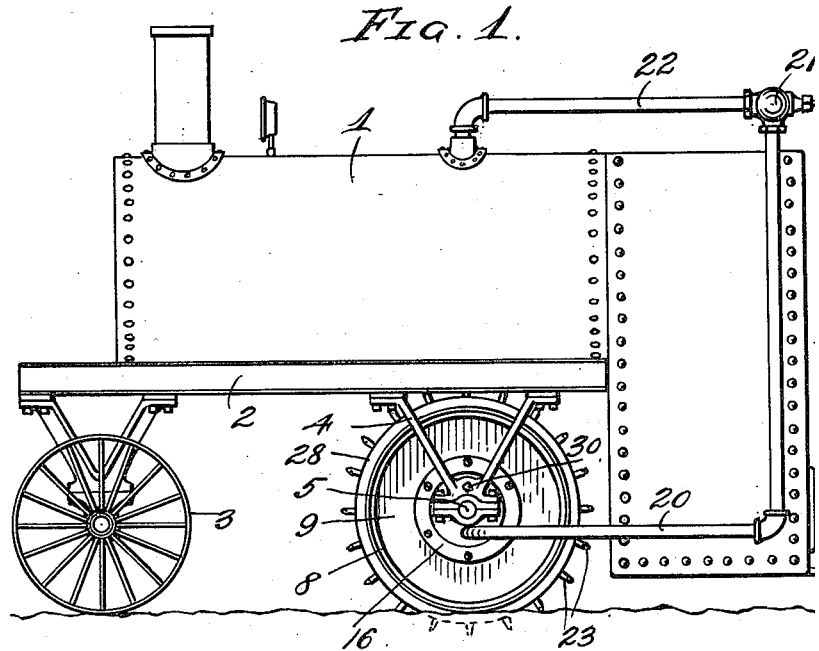
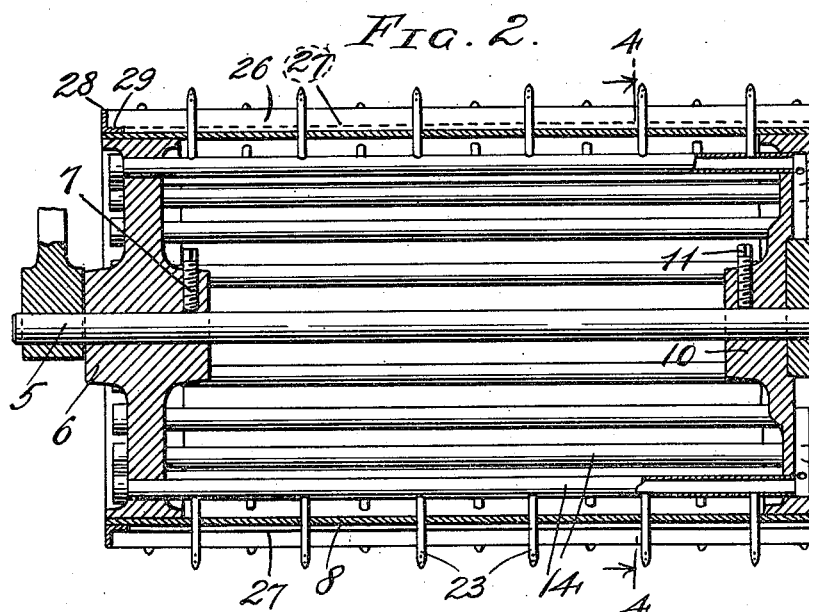
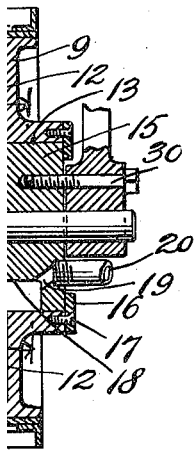
Witnesses:
A. L. Lord.
C. H. Tresch.
Inventor.
Herman D. Thayer

H. D. THAYER.
APPARATUS FOR TREATING THE SOIL.
APPLICATION FILED OCT. 22, 1913.

1,171,277.

Patented Feb. 8, 1916.
2 SHEETS—SHEET 2.

Witnesses:
A. L. Lord.
C. N. Tresch.

Inventor.
Herman D. Thayer
by B. W. Brockett.
Att'y.

UNITED STATES PATENT OFFICE.

HEMAN D. THAYER, OF CONNEAUT, OHIO

APPARATUS FOR TREATING THE SOIL.

1,171,277.  Specification of Letters Patent.  Patented Feb. 8, 1916.

Application filed October 22, 1913. Serial No. 796,694.

*To all whom it may concern:*

Be it known that I, HEMAN D. THAYER, a citizen of the United States, residing at Conneaut, in the county of Ashtabula and State of Ohio, have invented certain new and useful Improvements in Apparatus for Treating the Soil, of which the following is a specification.

This invention relates to improvements in agricultural implements and particularly to that class of devices utilized in treating the soil.

More particularly the invention relates to apparatus for controlling the supply of live steam to mechanism which conveys it to the soil under the surface thereof, without useless waste, for killing pests of various kinds and doing away with weeds and other undesirable crops which seed themselves from one season to the other.

The invention may be further briefly summarized as consisting in the construction and combination of parts hereinafter set forth in the following description, drawings and claims.

Figure 3:
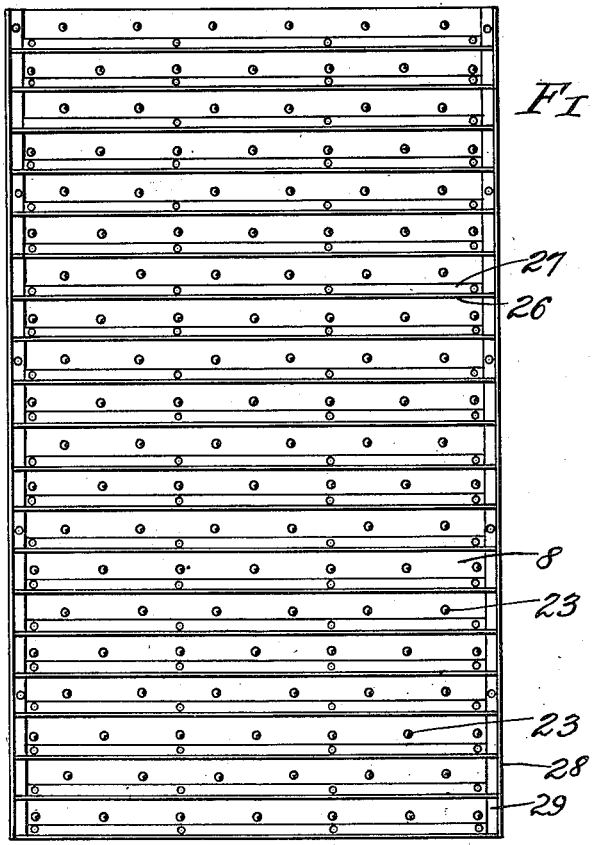
Figure 6:
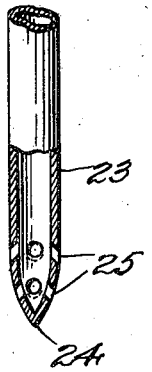
Figure 4:
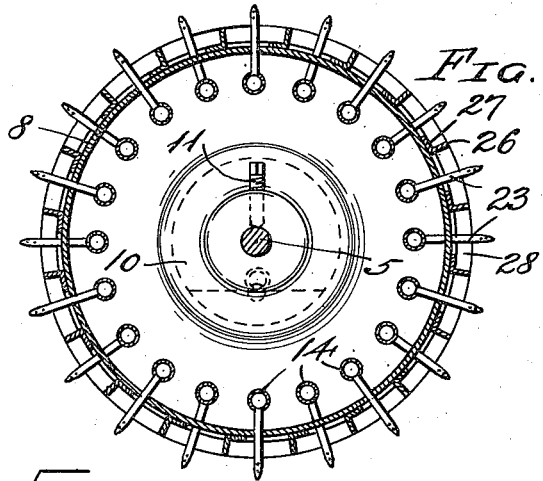
Figure 5:
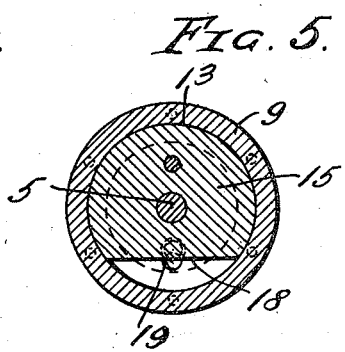

Referring to the drawings, Figure 1 is a side elevation of a machine adapted for the purpose and arranged to be drawn in any suitable manner over the soil; Fig. 2 is a longitudinal section of the feeding drum; Fig. 3 is a view of the developed periphery of the drum; Fig. 4 is a section upon the line 4—4 of Fig. 2 looking in the direction of the arrows; Fig. 5 is a section through the steam supplying means for the drum; and Fig. 6 is a view partly in section showing a portion of one of the spines or steam supplying tubes.

In carrying out the invention any preferred form and construction of parts may be employed but I have shown one arrangement which is effective in operation and in such embodiment 1 represents a steam boiler of any desired type for supplying steam to the apparatus. This boiler is mounted upon a suitable truck 2 supported upon steering wheels 3 and carrying a suitable bracket 4 which are mounted upon the shaft 5 of the steam feeding drum to be described.

The steam feeding drum comprises a head 6 secured to the shaft by screw 7 and having mounted a drum 8. This drum is opposite end with a head 9 secured to the shaft by me[ans] 11. This head is cored out ally disposed openings or p to a suitable chamber 13 f[or] head. Each of these ports with a longitudinally dis[posed] 14 threaded into the hea[d] through suitable openings will be seen from the foreg[oing] a radially disposed port 1[2] steam pipes 14.

Rotatably mounted with[in] is a valve member 15 held ber by means of an annul[ar] to the head by means of valve member is cut awa[y] in the various figures, so a more of the ports 12, as This valve member 15 is port 19 establishing com[munication] steam supply pipe 20 lea[ding] ling valve 21, this valve b[eing] a suitable pipe 22 with th[e] the steam pipes 14 is pro[vided] rality of spines or steam extending therefrom thr[ough] and at a distance from th[e] of these spines or dischar[ge] vided with a point 24 an[d] ings 25 on the side, as sho[wn] rows of spines or dischar[ge] gered, as shown in Fig. 3 tween adjacent rows are plates 26 having flanges drum. These blades exte[nd] of the drum and form rows of spines or discha[rge] ends of the drum suita[bly] provided, and these flang[es] by suitable base flanges drum in any suitable m[anner] 26 extend from the flang[es] flanges and plates closed about the rows of spines, pockets being such that rolled over the ground th[e]

embed themselves in the soil and the discharge of steam from the spines is confined to a small area and is not permitted to discharge freely through the soil. These plates and flanges also prevent the steam from blowing the soil away as would be the case where it was soft and light. The valve 15 is to be adjusted so that the cut away portion 18, which forms the steam supply pocket, is toward the ground, as shown, and in order to insure this arrangement the valve is held against rotation by means of a bolt or cap screw 30 extending through one of the brackets 4 into the valve.

From the foregoing it will be seen that as the apparatus is drawn over the ground, the spines, the plates and the flanges will embed themselves in the soil and steam will be supplied to those embedded in the soil by means of the valve member already described. As the steam is supplied to the soil, it passes into it and kills worms and bugs of every description, which are detrimental to growing things and also kills undesirable crops of weeds and the like which seed themselves from one season to the other.

Having described my invention, I claim:—

1. In apparatus for treating the soil, a steam supply, and means for delivering steam to a plurality of discharge devices adapted to embed themselves in the soil without disturbing the surface thereof and supply steam thereto under such surface, said discharge devices being isolated one from the other under the soil.

2. In apparatus for treating the soil, a steam supply, a rotary member having devices for supplying the steam to the soil under the surface thereof, and means for directing a supply of steam to only such of said devices as are embedded in the soil.

3. In apparatus for treating the soil, a steam supply, a rotary member having devices for supplying the steam to the soil under the surface thereof, and valve mechanism for directing a supply of steam to only such of said devices as are embedded in the soil.

4. In apparatus for treating the soil, a steam supply, a rotary member having devices for supplying the steam to the soil under the surface thereof, means for controlling a supply of steam to only such of said devices as are embedded in the soil, and means for directing the steam supplied to the soil and preventing the blowing of the soil.

5. In apparatus for treating the soil, a steam supply, a rotary member having devices for supplying the steam to the soil under the surface thereof, means for controlling a supply of steam to only such of said devices as are embedded in the soil, and confining pockets formed about the steam supplying devices.

6. In apparatus for treating the soil, a steam supply, a member having a plurality of devices adapted to be embedded in the soil without disturbing the surface thereof to supply steam thereto under such surface, and means above the surface of the soil for confining the steam thereto.

7. In apparatus for treating the soil, a source of steam supply, a drum, a plurality of steam discharge devices arranged throughout the periphery of said drum, said devices being adapted to embed themselves in the soil, and means for supplying steam to such of the devices as are embedded in the soil.

8. In apparatus for treating the soil, a source of steam supply, a drum, a plurality of steam discharge devices arranged in longitudinal groups upon the face of said drum, each of said groups having an independent steam supply within the drum, and valve mechanism for controlling the supply of steam to said group supplies and arranged to permit the discharge of steam only to the group embedded in the soil as the drum passes over the same.

9. A drum for apparatus for treating the soil comprising a pair of heads, one of said heads being provided with radially disposed steam ports, a conduit connected to each port extending longitudinally within the drum, steam discharge devices extending through the drum from each conduit, and valve mechanism in the head for distributing steam to such of the ports as are embedded in the soil.

10. A drum for apparatus for treating the soil comprising a pair of heads, one of said heads being provided with radially disposed steam ports, a longitudinal conduit connected to each port, steam discharge devices extending through the drum and connected to each conduit, and valve mechanism in the head for distributing steam to such of the ports as are embedded in the soil, and comprising a valve casing having a valve chamber communicating with all of said ports, a valve member mounted in said chamber and having a cut away portion forming a steam pocket for furnishing steam to a limited number of said ports, means for supplying steam to said pocket, and means for holding said valve against rotation.

11. A drum for apparatus for treating the soil comprising a pair of heads, one of said heads being provided with radially disposed steam ports, a longitudinal conduit connected to each port, a plurality of spines extending through the drum and connected to each conduit, and valve mechanism in the head for distributing steam to such of the ports as are embedded in the soil, and comprising a valve casing having a valve chamber communicating with all of said ports, a valve member mounted in said chamber and having a cut away portion forming a steam pocket for furnishing steam to a limited number of said ports, means for supplying steam to said pocket, and means for holding said valve against rotation.

In testimony whereof I affix my signature in presence of two witnesses as follows.

HEMAN D. THAYER.

Witnesses:
  B. C. EADES,
  G. H. BURKE.